United States Patent [19]

Stringer

[11] Patent Number: 5,778,733
[45] Date of Patent: Jul. 14, 1998

[54] SPINNING NUT LINEAR MECHANICAL LOCK

[75] Inventor: Calvin R. Stringer, Saugus, Calif.

[73] Assignee: P. L. Porter Co., Woodland Hills, Calif.

[21] Appl. No.: 850,645

[22] Filed: May 2, 1997

Related U.S. Application Data

[63] Continuation of Ser. No. 541,148, Oct. 11, 1995, abandoned.

[51] Int. Cl.[6] .............................. B60N 2/08; F16H 29/20
[52] U.S. Cl. .................... 74/527; 74/89.15; 297/362.14
[58] Field of Search ................ 297/362.14; 74/89.15, 74/527

[56] References Cited

U.S. PATENT DOCUMENTS

| | | | |
|---|---|---|---|
| 4,630,866 | 12/1986 | McFarlane | 297/362.14 |
| 4,881,775 | 11/1989 | Rees | 297/362.14 |
| 5,280,999 | 1/1994 | Jones et al. | 297/362.14 X |
| 5,299,853 | 4/1994 | Griswold et al. | 297/362.14 X |
| 5,320,413 | 6/1994 | Griswold et al. | 297/362.14 X |

*Primary Examiner*—Charles A. Marmor
*Assistant Examiner*—Mary Ann Battista
*Attorney, Agent, or Firm*—Beehler & Pavitt

[57] ABSTRACT

A mechanical lock of the type having a lock housing, a rotatable nut axially captive in the housing, a threaded rod axially displaceable through the housing in threading engagement with the nut, and a detent normally locking the nut against rotation in the housing to prevent axial translation of the rod through the housing. Camming surfaces on the nut urge the detent out of locking engagment with the nut when the nut is torqued by axial force on the threaded rod. A detent control element normally keeps the detent in locking engagement with the nut until the detent control element is displaced by an actuator to an unlocked position. The detent control element has a camming surface which urges the detent into locking engagement with the nut when the detent control element is returned to a locking position. The preferred detent is a ball bearing and two variants of the mechanism are disclosed, one having a linearly reciprocating shuttle as the control element, the other using a rotating shaft for this purpose.

23 Claims, 3 Drawing Sheets

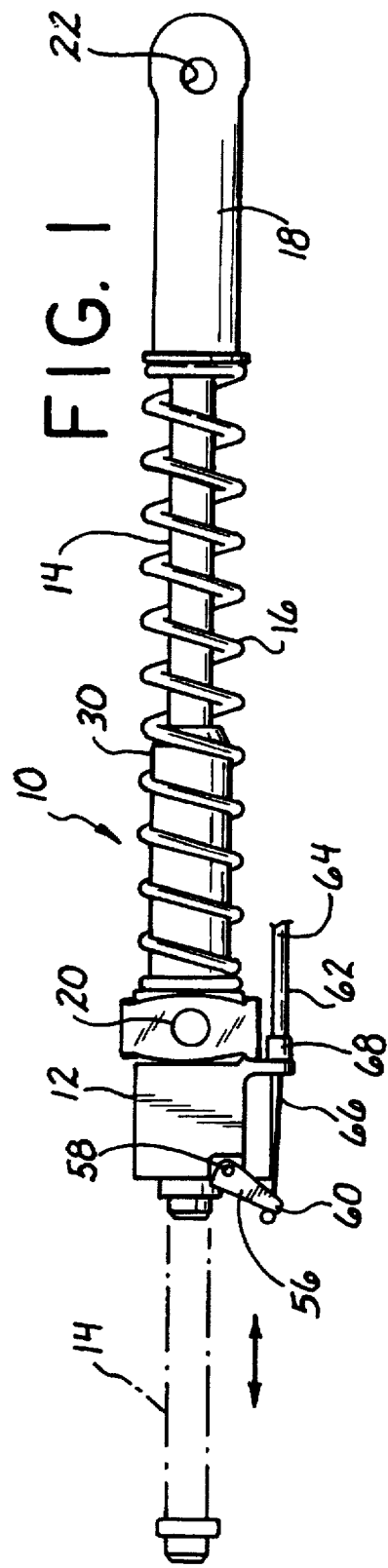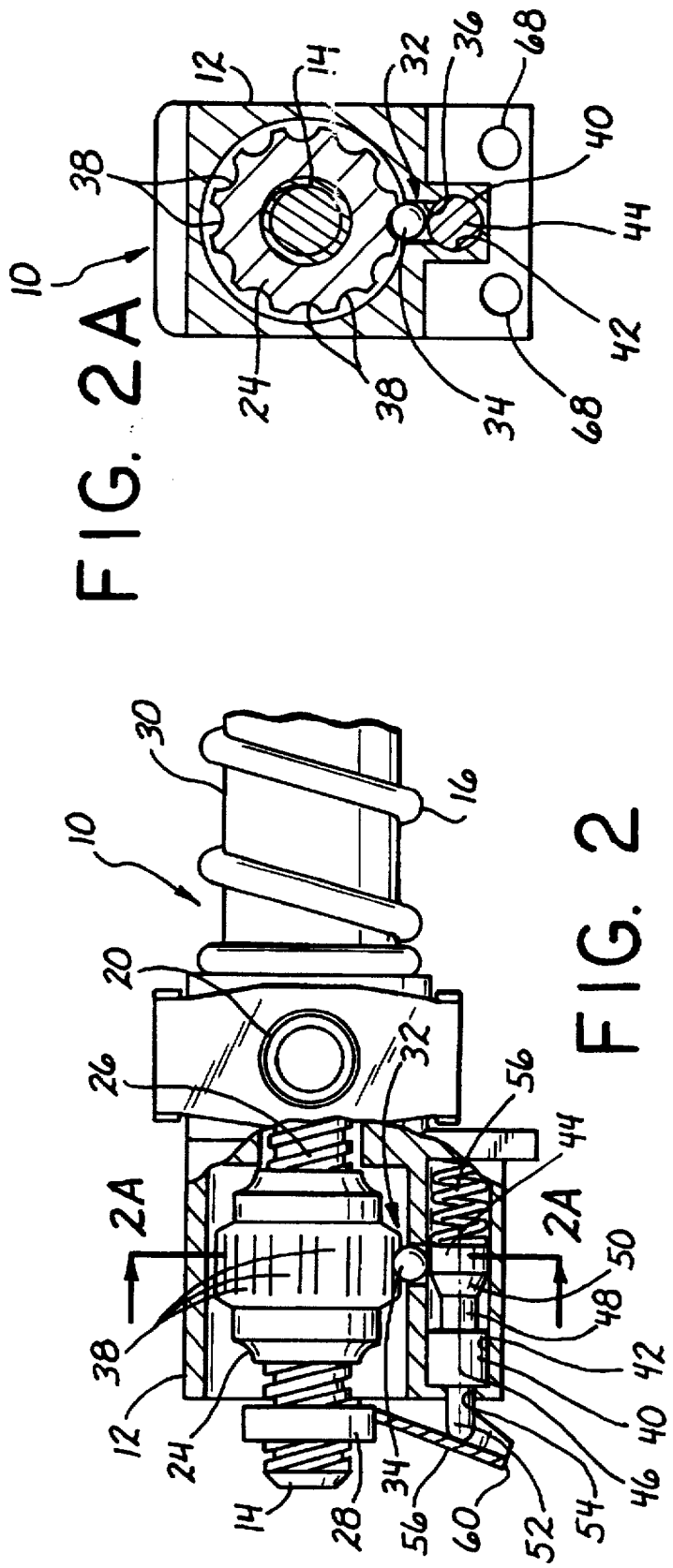

SPINNING NUT LINEAR MECHANICAL LOCK

This application is a continuation of Ser. No. 08/541,148 filed on Oct. 10, 1995, now abandoned.

BACKGROUND OF THE INVENTION

1. Field of the Invention

This invention relates to linear mechanical locks of the spinning nut type, in which a rod is axially displaceable through a lock housing, a nut threaded on the rod is rotated in the lock housing by axial translation of the shaft, and the shaft can be axially fixed relative to the housing by locking the nut against rotation. More specifically, the present invention concerns an improved nut detent mechanism for locking the nut in such linear locks.

2. State of the Prior Art

Linear mechanical locks have a lock housing and a rod which is axially movable through the lock housing. The rod has a helical thread on at least part of its length, and a nut with a mating interior thread is threaded on the rod. The nut is axially captive in the lock housing but is free to turn in either direction, such that axial translation of the shaft through the lock housing results in rotation of the nut in one direction or another. A detent mechanism normally prevents rotation of the nut, fixing the position of the shaft relative to the housing. Repositioning of the shaft is achieved by momentarily disengaging the detent to permit rotation of the nut. Such locks are employed to set the relative positioning between two structures, for example, for setting the position of an adjustable seat which is movable on floor tracks towards and away from the dashboard in an automotive vehicle.

A spinning nut linear lock is disclosed in U.S. Pat. No. 4,630,866 issued to McFarlane, in which the rotation of the nut is normally prevented by a detent in the form of a cylindrical locking pin which is movable radially to the nut axis into and out of engagement with slots defined in the outer surface of the nut. The locking pin is spring biased into engagement with the nut to keep the mechanical lock in a normally locked condition. Release of the lock is achieved by means of a pull cable attached to one end of a bellcrank, the other end of the bellcrank engaging the locking pin. When the cable is pulled, the bellcrank pivots and retracts the locking pin away from the nut, which is then free to turn in the lock housing and permits axial displacement of the threaded shaft.

While such prior art mechanisms perform their intended function, improvement is desirable to achieve a simpler, more compact and smoother acting detent mechanism for locking and unlocking the spinning nut in linear mechanical locks of this type.

SUMMARY OF THE INVENTION

The present invention addresses the aforementioned need by providing an improved mechanical lock of the type having a housing, a rotatable nut axially captive in the housing, a threaded shaft axially displaceable through the housing in threading engagement with the nut, and a detent arrangement actuatable for locking the nut against rotation in the housing. The detent arrangement includes a detent element movable into interlocking relationship with the nut for locking the nut against rotation in the housing. A detent control element normally retains the detent in interlocking position, preventing axial translation of the threaded shaft through the lock housing. The detent control element is actuatable for admitting the detent out of interlocking relationship to permit rotation of the nut and thus axial translation of the shaft through the lock housing. The detent control element is movable between a locking position and an unlocked position, and preferably has a spring biasing the control element towards its locking position.

In one aspect of this invention the detent element is restricted to movement radial to the nut, for example, in a detent bore defined in the lock housing radially to the nut. One or more first camming surfaces may be provided on the nut for urging the detent out of interlocking position and towards the detent control element in response to turning of the nut. A second camming surface may be provided on the control element for urging the detent in the opposite radial direction, i.e., into interlocking position responsive to return of the control element from the unlocking position to the locking position. The detent may include a spherical surface acting against the nut, and the first camming surface or surfaces may be defined by one or more depressions in an outer surface of the nut, such as one or more cylindrical groove surfaces. The second camming surface may comprise a surface of the control element angled to both a radius of the nut and the direction of movement of the control element between the locking and unlocked positions.

In a preferred form of the invention, the detent element is a spherical ball detent. Each depression in the nut is concavely shaped to admit part of the ball detent, and a remaining protruding portion of the ball detent makes an interference fit with the lock housing in the direction of rotation of the nut. The depressions may be of conforming curvature to the ball detent, but may also have any cross-sectional shape which provides a camming surface operative for urging the detent radially outwardly from the nut in response to turning of the nut. In the presently preferred form of the invention the depressions are mutually parallel grooves oriented in an axial direction of the nut and spaced circumferentially on the outer surface of the nut, and each groove has an approximately semi-circular cross-section.

In one embodiment of the invention the detent control element is linearly movable between its locking and unlocked conditions. In an alternate embodiment of the invention, the detent control element is rotatably movable between its locking and unlocked conditions. An actuating system remote from the lock housing may be connected by a control linkage for displacing the detent control element between its locking and unlocked positions. Alternatively, the detent control element may be directly manually actuatable.

More specifically, the detent control element may comprise a shuttle body linearly displaceable against a compression spring in the lock housing between the locking and unlocked positions in a direction transverse to a radius of the nut, and which may also be parallel to the threaded shaft. In such case the second camming surface may include a cam portion of the shuttle body. The shuttle may be a cylindrical body having a radially enlarged portion which in the locking condition of the shuttle is positioned for containing the detent element in interlocking relationship with the nut, and further has a radially smaller portion which in the unlocked condition is positioned for admitting the detent element out of interlocking relationship, and wherein the second camming surface includes a tapering portion of the cylindrical body connecting its radially larger and radially smaller portions.

In an alternate form of the invention, the detent control element may comprise a shaft mounted for rotation in the lock housing, a torque spring rotationally biasing the shaft to a locking position wherein the shaft contains the detent in interlocking relationship with the nut, the shaft being rotatable against the torque spring to bring a recessed shaft portion into receiving position for admitting the detent element out of interlocking relationship, thereby to free the nut for rotation. In this case the second camming surface can be defined in the recessed shaft portion. The recessed cam portion may take the form of a conical recess defined radially in the shaft.

The remote actuating system may include a control cable connected between the remote actuating means and the detent control element, the control cable including a sleeve connected between the lock housing and a control wire slidable within the sleeve, such that the detent control element may be displaced to its unlocked position by pulling on the wire relative to the sleeve by means of a suitable remote actuator.

These and other improvements, features and advantages of the present invention will be better understood by reference to the following detailed description of the preferred embodiments taken in conjunction with the accompanying drawings.

BRIEF DESCRIPTION OF THE DRAWINGS

FIG. 1 is a longitudinal side view of a linear mechanical lock according to this invention, the threaded rod being shown in extended condition in solid lining, and in compressed condition in phantom lining;

FIG. 2 is a detail view of the lock of FIG. 1 with the lock housing broken away to expose the spinning nut on the threaded shaft and the shuttle operated ball detent mechanism;

FIG. 2A is a cross-sectional view of the spinning nut and detent mechanism taken along line 2A—2A in FIG. 2, showing the control shuttle in locking position and the ball detent interlocking the nut to the lock housing;

DETAILED DESCRIPTION OF THE PREFERRED EMBODIMENTS

Figure 3:
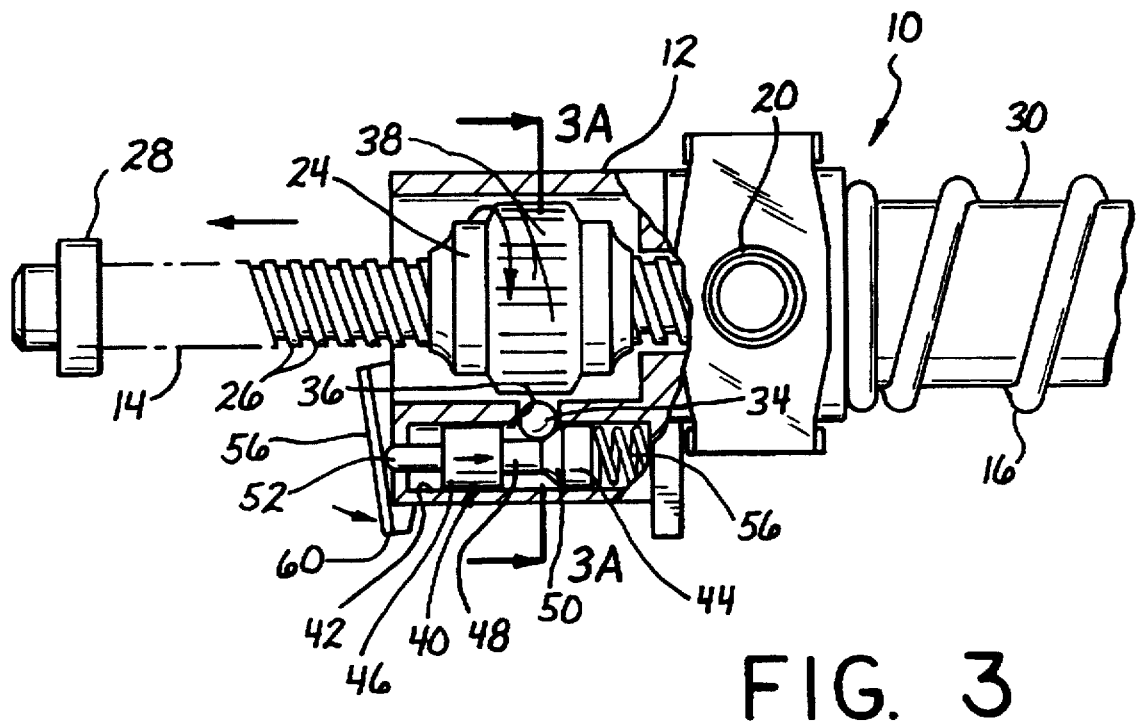
FIG. 3 is a view as in FIG. 2 but showing the control shuttle displaced to its unlocked position to allow disengagement of the ball detent from the spinning nut.

With reference to the accompanying drawings, FIG. 1 shows a linear mechanical lock, generally designated by the numeral 10, improved according to this invention, as will be explained below. The mechanical lock 10 has a lock housing 12 through which is axially displaceable a rod 14 between a fully extended position shown in solid lining and a compressed position indicated in phantom lining. An external coil spring 16 compressed between the housing 12 and the end 18 of the rod urges the rod towards its extended position. In actual use the lock 10 is typically mounted between two structural elements by means of a trunion mount 20 which serves to attach the lock housing to one structural element, and a bolt or similar hardware inserted through mounting hole 22 in the end 18 of the rod for connecting the rod to another structural element.

Turning now to FIGS. 2 and 2A, a nut 24 is contained in the housing 12 against axial movement but is free to rotate in the housing. The rod 14 is threaded along at least a part of its length, as with a multi-start Acme thread, and is engaged to a mating internal thread of the nut 24. The rod 14 is otherwise freely axially movable through the housing 12. Axial displacement of the rod through the housing causes the nut 24 to spin in one direction or the other, depending on the direction of displacement of the rod. Extension of the rod through the housing 12, towards the right in FIG. 1, is limited by a stop ring 28, while compression of the rod into the housing is similarly limited by a suitable stop element internal to the spring support sleeve 30 and not shown in the drawings.

Axial translation of the rod 14 through the housing 12 operates to change the effective length of the linear lock 12 as measured between the trunion mount 20 and the mounting hole 22 in FIG. 1. Locking of the rod 14 relative to the lock housing 12, in order to fix the spacing between two structural elements interconnected by the lock 10, is achieved by locking the nut 24 against rotation in the housing 12. This is accomplished by means of a detent mechanism generally designated by the numeral 32. The detent mechanism includes a spherical ball detent 34 which is movable within a detent bore 36 defined in the housing 12 in a direction radial to the nut 24. The nut is ringed with a series of longitudinal grooves 38 which are mutually parallel in the direction of the axis of the nut and are regularly spaced from each other about the circumference of the nut, as best understood from FIG. 2A. A detent control element in the form of a shuttle 40 is linearly movable within the housing 12 in a shuttle bore 42 defined in the lock housing in a direction transverse to the radial detent bore 36 and parallel to the common axis of the nut 24 and rod 14. The shuttle 40 is a generally cylindrical body, i.e. has radial symmetry about its longitudinal axis of displacement. The shuttle 40 has two full diameter portions 44, 46 separated by a mid-portion 48 of reduced diameter and a tapering, frustoconical section 50 which connects the full radius end portion 44 with the midportion 48 of reduced radius. A stem 52 extends axially from one end of the shuttle through a hole 54 in the lock housing. A coil spring 56 is compressed in the shuttle bore 42 between the shuttle 40 and the end wall of the shuttle bore, thereby urging the shuttle to the left in FIG. 2 and the stem 52 to an extended condition through the hole 54. In this position of the shuttle, the radially large end portion 44 of the shuttle body is aligned with the detent bore 36, and keeps the ball detent out of the shuttle bore 42 and in positive engagement with the periphery of the nut 24. As best understood from FIG. 2A, in this condition the ball detent 44 is partially contained in the detent bore 36 and partially in mating engagement with one of the grooves 38 in the nut 24. The ball detent in this condition interlocks the nut 24 to the lock housing 12 by means of an interference fit between the two elements and prevents rotation of the nut, which in turn prevents axial translation of the rod 14 through the lock housing, thereby fixing the effective length of the linear lock.

Figure 3A:
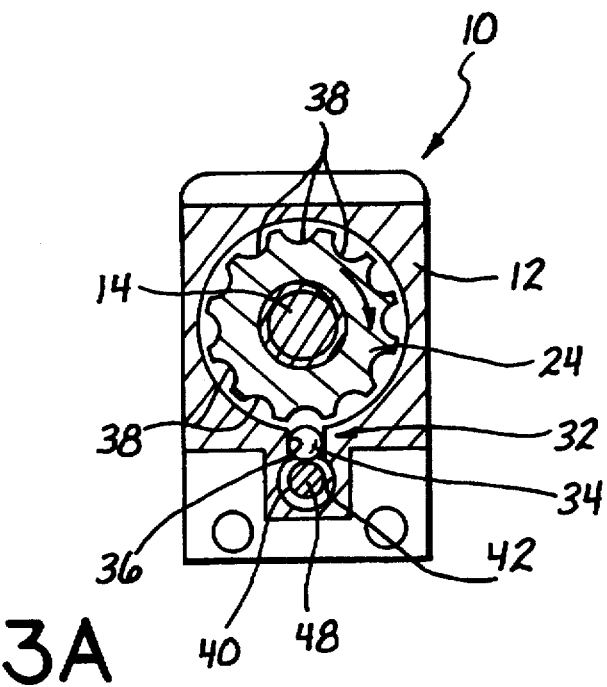
FIG. 3A is a sectional view taken along line 3A—3A in FIG. 3.

Unlocking of the device 10 is accomplished by displacing the shuttle 40 linearly along its axis against the urging of the spring 56, so as to bring the mid-section 48 of reduced radius into alignment with the detent bore 36. This in turn is achieved by means of an actuating arrangement which in the embodiment illustrated in FIGS. 1 through 3 includes an actuating lever 56 pivoted to the lock housing at 58 and having a free end 60. An actuating linkage consisting of a Bowden type cable 62 has an outer sleeve 64 and an inner wire 66 which is longitudinally slidable within the sleeve 64. The cable 62 is connected at a remote end (not shown in the drawings) to a suitable actuating unit which may be of conventional design and may consist of a button or other actuating element movable in relation to a frame or base. The proximal end of the sleeve 64 is fixed to the lock housing 12 at a flange 68 in FIG. 1. As seen in FIG. 2A the flange 68 supports the ends of two cable sleeves, each of which contains an inner wire 66 connected to the end 60 of the lever 58, so that the lock 10 can be actuated from two separate remote locations. The corresponding proximal end of the internal wire 66 of the cable in turn is attached to the free end 60 of the lever 56. The remote end of the linkage cable 62 is connected to the actuating unit which is operative for pulling the wire 66 within the sleeve 62, i.e. to exert a pulling force on the wire relative to the sleeve at the remote or distal end of the cable, which when transmitted to the proximal end of the cable has the effect of pulling the end of the lever 56 towards the lock housing 12 and pressing the stem 52 into the lock housing, thus displacing the shuttle 40 to the right in FIG. 2 by compressing the spring 56. The displacement of the shuttle is such as to bring the midportion 48 of the shuttle into the aforementioned alignment with the detent bore 36. In this position of the shuttle, the ball detent is partially admitted into the shuttle bore 42, as illustrated in FIGS. 3 and 3A, and is retracted into the detent bore 36 out of engagement with the nut 24, which is then no longer interlocked to the lock housing 12 and is free to spin relative to the lock housing. In this unlocked condition of the shuttle 40 the rod 14 may be axially displaced through the lock housing, in the process causing the nut 24 to spin in one direction or another depending on the direction of translation of the rod 14. This condition persists so long as pulling force is applied through the wire 66 to the actuating lever 56 for holding the shuttle 40 against the urging of the compressed spring 56. Once pulling force on the actuating lever is removed, the spring 56 returns the shuttle 40 to its normal, locking position of FIGS. 2, 2A, at the same time pushing the stem 52 against the lever 56 which swings the lever 56 away from the lock housing and pulls the wire 56 back out from the sleeve 64, thus returning the entire system to its normal, locked condition.

The longitudinal grooves 38 in the nut 24 each have a semi-cylindrical shape with a radius which closely matches the radius of the spherical ball detent 34. The concavely curved interior surface of each groove 38 provides a camming action against the ball detent whenever torque is applied to the nut, as occurs when an axial force acts to the rod 14. Given that the ball detent 34 is captive within the radial detent bore 36, rotation of the nut 24 exerts a net radial force on the ball detent which tends to dislodge the detent away from the nut 24 and into the bore 36, so as to free the nut for rotation in the housing 12 if the position of shuttle 40 allows it. Consequently, the camming effect of the nut acting on the ball detent results in a positive disengagement of the ball detent from the nut whenever axial force is applied to the nut and the shuttle 40 is in its unlocked position of FIGS. 3, 3A. This camming action of the nut against the ball detent occurs equally for either direction of rotation of the nut 24, given the symmetry of the semi-circular cross section of the grooves 38 and the spherical symmetry of the ball detent. The lock 10 is preferably installed with the detent bore extending downwardly under the nut 24 so that upon displacement of the shuttle 40 to its unlocked position the ball detent is assisted by the force of gravity in disengaging and moving away from the nut, without necessarily requiring camming action by the turning nut for such disengagement. However, the camming action of the nut is desirable and preferred as it assures positive disengagement of the ball detent without reliance on gravity.

The frustoconical section 50 of the shuttle body presents a surface which in the axial direction of the shuttle is at approximately a 45 degree angle to the axis of the shuttle body, and is similarly angled to the direction of movement of the ball detent 34 in the detent bore 36. In returning the shuttle to its locking position of FIGS. 2, 2A from the unlocked condition of FIGS. 3–3A the force of coil spring 56 also operates, as a result of camming action of the tapered section 50 of the shuttle against the ball detent, to urge the ball detent within the detent bore 36 into interlocking engagement with the nut 24 by seating the ball detent into one of the grooves 38. This camming action of the shuttle on the ball detent occurs during transition of the shuttle towards its locking position. Once the shuttle is in its locking position the ball detent cannot be dislodged from interlocking engagement because the cylindrical end section 44 of the shuttle opposes and contains the ball detent in the detent bore 36. Disengagement of the ball detent from the nut is then possible only after actuation of the shuttle from its locking to its unlocked position.

As just explained, release of the shuttle from its unlocked position causes the ball detent 34 to be urged by camming action towards and against the nut 24. Even if the nut 24 is positioned such that none of the grooves 38 is exactly aligned with the detent bore 36 for receiving the ball detent 44, this misalignment is quickly corrected as any slight movement of the rod 14 through the lock housing 12 will cause the nut to rotate into the necessary alignment, regardless of the direction of rotation of the nut. A groove 38 will quickly come into position for receiving the ball detent, resulting in immediate locking of the nut and consequently of the rod 14 relative to the lock housing. The engagement of the ball detent with the nut is smooth due to the spherical curvature of the ball detent seating into the semi-circular cross sectional curvature of a groove 38, and is sufficiently smooth and gentle to permit such engagement of the ball detent even if the nut 24 is spinning when the shuttle 40 is released from its unlocked condition. Interlocking engagement of the ball detent with the nut will still occur, stopping rotation of the nut. The ball detent 34, which preferably is a steel ball bearing, is capable of withstanding the resulting stresses and transmitting these to the lock housing, or to the end portion 44 of the shuttle body which in turn transmits this force also to the lock housing.

Figure 4:
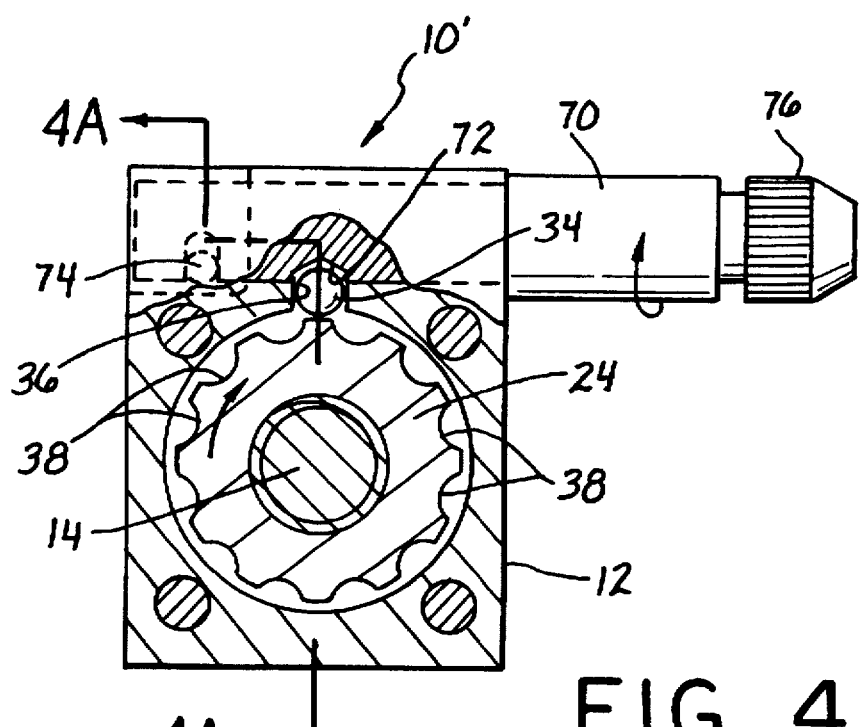
FIG. 4 is a cross-sectional view of the lock housing in an alternate form of the invention wherein the ball detent is controlled by a rotary shaft, showing the ball detent retracted into a receiving cavity of the control shaft and out of interlocking engagement with the nut.
Figure 4A:
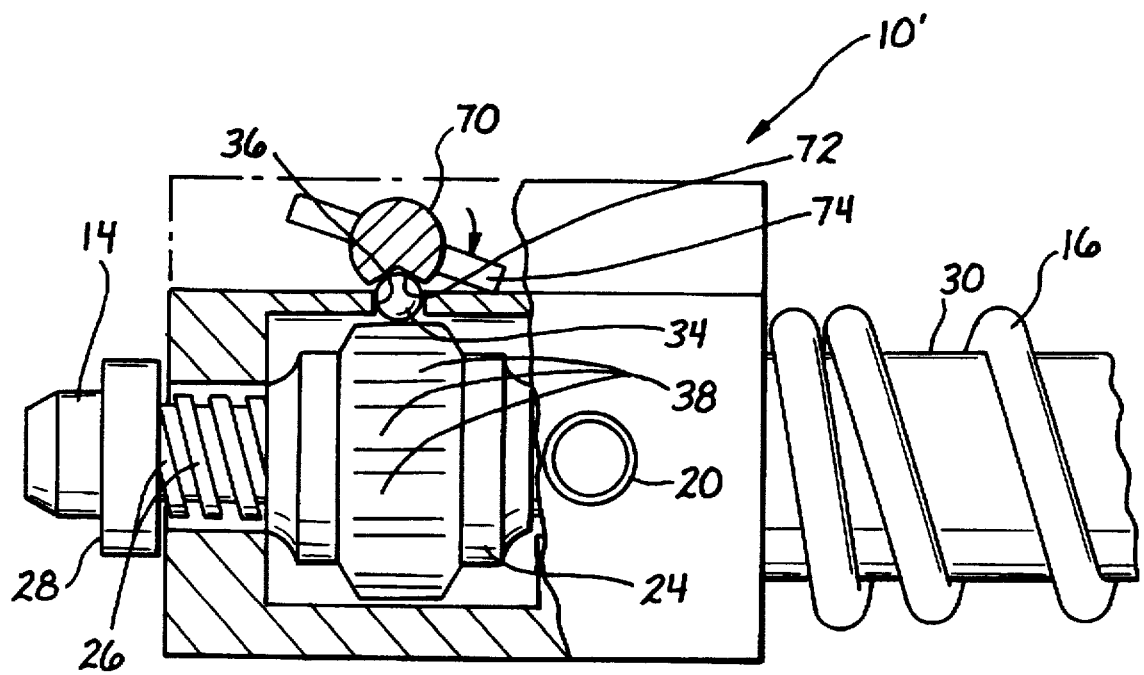
FIG. 4A is a sectional view taken along line 4A—4A in FIG. 4.

FIGS. 4, 4A illustrate an alternate embodiment 10' of the spinning nut linear lock according to this invention wherein the linear shuttle actuating mechanism of FIGS. 2–3A has been replaced by a rotary actuating spindle or shaft 70 which is rotatably mounted to the lock housing 12 transversely to the axis of the rod 14 and nut 24. The spindle 70 is a cylindrical shaft which however has a conical recess or cavity 72 defined radially in the shaft. In the unlocked position of the lock 10' illustrated in FIGS. 4 and 4A, the conical depression 72 partially admits the ball detent 34 from the detent bore 36 to a degree sufficient to permit the ball detent to retract into the detent bore and out of interlocking engagement with the nut 24, as illustrated in the drawings, so as to permit rotation of the nut. The shaft 70 is biased by a torsion spring 74 compressed between the shaft 70 and the lock housing 12, which applies a torque bias to the shaft 70 rotationally urging the shaft 70 to a normal locking position wherein the conical recess 72 is moved circumferentially about the axis of shaft 70 and out of alignment with the detent bore 36. When the shaft is released from the unlocked position with the ball seated in the recess 72, the internal conical surface of the recess 72 exerts a camming action on the ball detent 34, under the urging of the torsion spring 74, with the net effect that the ball detent is urged radially inwardly through the detent bore 36 and into interlocking engagement with the nut 24 analogous to that described in connection with FIGS. 2, 2A. The ball detent is held in such interlocking engagement by the full diameter of the shaft 70 which blocks the radially outer end of the detent bore 36 and prevents the ball detent from disengaging from the nut until the shaft is again turned to its unlocked condition. The shaft 70 may be equipped with an actuating handle on its free end 76, which can be manually operated to turn the shaft to the unlocked position of FIGS. 4, 4A. The operation of the lock in FIGS. 4, 4A is in all other respects similar to that of the embodiment described in connection with FIGS. 1–3A.

It should be appreciated that in both the described embodiments the ball detent is urged into and out of interlocking engagement with the nut by camming action of a detent control element and the nut respectively. The nut and the detent control element are provided with camming surfaces which act to drive the detent in opposite directions within the detent bore. The camming surfaces may be generally characterized as being angled with respect to both the longitudinal axis of the detent bore on the one hand and the direction of movement of the nut or the control element, respectively, on the other hand. The reliance on these camming surfaces results in considerable simplification of the detent mechanism, with a resultant improvement in reliability. It should be understood however that the detent need not be limited to a ball element but may have other shapes, such as an elongated element with a spherically curved or otherwise shaped end surface acting against the nut, while still operating in the fashion described above. Likewise, the grooves in the nut need not be of semicircular cross-section as it is possible to provide effective camming surfaces of different shapes on the nut.

From the above, it will be appreciated that a detent mechanism for a spinning nut type linear lock has been disclosed which features a minimum number of parts resulting in simplified, economical construction without sacrifice in reliability and effectiveness of operation. The lock mechanism is furthermore of compact, space saving construction and dimensions, an important consideration in many applications for these linear mechanical locks.

While particular embodiments of the invention have been described and illustrated for purposes of clarity and example, it must be understood that many changes, substitutions and modifications to the described embodiments will be apparent to those possessed of ordinary skill in the art without thereby departing from the scope and spirit of the present invention which is defined by the following claims.

What is claimed is:

1. A mechanical lock having a lock housing, a rotatable nut axially captive in said housing, a threaded rod axially displaceable through said housing in threading engagement with said nut, a detent element movable into interlocking relationship with said nut for locking said nut against rotation in said housing, and detent control means normally in a locking position for containing said detent element in said interlocking relationship thereby to prevent axial translation of said rod through said nut, said control means being actuatable for displacing said control means to an unlocked position for admitting said detent element out of said interlocking relationship thereby to permit rotation of the nut and axial translation of the rod through said housing, characterized in that first cam means are provided on said nut operative for urging said detent element out of said interlocking relationship in response to torquing of the nut in either sense of rotation, and said detent element is displaced from said interlocking position only in said unlocked position of said control element.

2. The mechanical lock of claim 1 wherein said detent element is movable into and out of said interlocking relationship in a direction radial to said nut, said detent control means having second cam means movable in a direction transverse to said direction radial and operative for returning said detent element to said interlocking relationship responsive to return of said detent control means to said locking position.

3. The mechanical lock of claim 1 wherein said detent element comprises a ball element contained in said housing and movable radially to said nut, and said first cam means are defined by one or more detent receiving depressions in an outer surface of said nut, said depressions each shaped to admit part of said ball element, a remaining protruding portion of said ball element interlocking with said housing in said interlocking relationship.

4. The mechanical lock of claim 2 wherein said control means are linearly movable between said locking position and said unlocked position.

5. The mechanical lock of claim 2 further comprising a control cable, said control cable including a sleeve connected to said housing, and a control wire slidable in said sleeve and connected to said detent control means, said wire being operative for displacing said control means between said locking position and said unlocked position responsive to differential pulling force applied to said wire and said sleeve.

6. The mechanical lock of claim 1 wherein said control means comprises a shuttle linearly displaceable in said housing between said locking position and said unlocked position, said shuttle having a cam portion operative for urging said detent element into said interlocking relationship during return of the shuttle towards said locking position.

7. The mechanical lock of claim 6 further comprising spring means normally biasing said shuttle towards said locking position, said shuttle being displaceable against said biasing to said unlocked position, and means operable for displacing said shuttle from said locking to said unlocked position.

8. The mechanical lock of claim 6 wherein said shuttle is a cylindrical body having a radially larger portion positioned in said locking position for containing said detent element in said interlocking relationship, a radially smaller portion positioned in said unlocked position for receiving said detent element out of said interlocking relationship, said cam portion comprising a tapering portion connecting said radially larger portion and said radially smaller portion.

9. The mechanical lock of claim 2 wherein said control means are rotatably movable between said locking and unlocked conditions.

10. The mechanical lock of claim 9 wherein said control means comprise a shaft mounted for rotation to said housing, said shaft being rotatable to bring a recessed shaft portion into receiving position for admitting said detent out of said interlocking relationship thereby to free said nut for rotation.

11. The mechanical lock of claim 10 wherein said second cam means comprises an internal surface of said recessed shaft portion.

12. The mechanical lock of claim 10 wherein said control means comprise a shaft mounted for rotation to said housing, said shaft having a conical recess defined radially therein, said shaft being rotatable to bring said conical recess into an unlocked position for admitting said detent out of said interlocking relationship thereby to free said nut for rotation, and spring means biasing said shaft to a locking position wherein said detent is retained in said interlocking relationship by said shaft.

13. A mechanical lock having a lock housing, a threaded rod axially displaceable through said housing, a rotatable nut threaded on said rod and axially captive in said housing, and a spherical ball detent normally locking said nut against rotation in said housing, said ball detent being partially received in a depression in an outer surface of said nut for interlocking said nut against rotation in said housing, said depression being shaped to urge said ball detent out of the depression by camming action responsive to torquing of said nut by axial force applied to said rod, a detent control element normally positioned for containing said ball detent in said depression against said camming action, said control element being repositionable for receiving said ball detent from said depression thereby to free the nut for said rotation.

14. The lock of claim 13 further comprising spring means biasing said detent control element towards said normally containing position and detent control means actuatable for displacing said ball detent against said biasing away from said normally containing position, said detent control means having a camming surface operative for urging said ball detent into said depression upon return of said detent control element for containing said ball detent in response to said biasing.

15. The lock of claim 14 wherein said detent control element comprises a cylindrical shuttle body slidable in said housing parallel to said rod and wherein said camming surface is defined between a radially larger portion and a radially smaller portion of the shuttle.

16. The lock of claim 13 wherein said control means comprise a shaft mounted for rotation to said housing, said shaft being rotatable to bring a recessed portion of said shaft into receiving position for admitting said ball detent out of said interlocking relationship thereby to free said nut for rotation.

17. The lock of claim 13 wherein said depression is one of a plurality of mutually parallel grooves oriented in an axial direction and spaced circumferentially on said outer surface of said nut.

18. The lock of claim 17 wherein said grooves are each approximately semi-circular in cross-section and dimensioned for partially receiving said ball detent, a remainder of said ball detent making an interference fit with said lock housing to prevent rotation of said nut therein.

19. A mechanical lock having a lock housing, a rotatable nut axially captive in said housing, a threaded rod axially displaceable through said housing in threading engagement with said nut, a detent element movable in said housing radially to said nut into interlocking position for locking said nut against rotation in said housing, a control element movable transversely to the radial movement of the detent element between a locking position for containing said detent element in said interlocking position and an unlocked position for admitting said detent element out of said interlocking position and thus permit rotation of the nut and axial translation of the rod through said housing, first camming means on said nut operative for urging said detent element out of said interlocking position and towards said control element in response to torquing of the nut in either sense of rotation of the nut about said rod, such that said detent element is displaced from said interlocking position only in said unlocked position of said control element, and second camming means on said control element for urging said detent element into said interlocking position responsive to return of said control element from said unlocked position to said locking position.

20. The mechanical lock of claim 19 wherein said detent element includes one or more spherically curved surface portions engageable by each of said first camming means and said second camming means, said first camming means comprise a plurality of cylindrical groove surfaces defined in said nut, and said second camming means comprise a surface in said control element angled to both a radius of said nut and the direction of movement of said control element between said locking and unlocked positions.

21. The mechanical lock of claim 20 wherein said control element is linearly movable in said housing between said locking and unlocked positions.

22. The mechanical lock of claim 20 wherein said control element is rotatably movable in said housing between said locking and unlocked positions.

23. The mechanical lock of claim 19 said control element comprising an actuating shaft mounted for rotation to said housing, said shaft being rotatable to bring said conical recess into an unlocked position for admitting said detent out of said interlocking relationship thereby to free said nut for rotation, and spring means biasing said shaft to a locking position wherein said detent is retained in said interlocking relationship by said shaft.

* * * * *